Dec. 6, 1932. F. AHLBURG 1,889,967
FRUIT MARKER
Filed May 28, 1930 9 Sheets-Sheet 1
FIG_1_
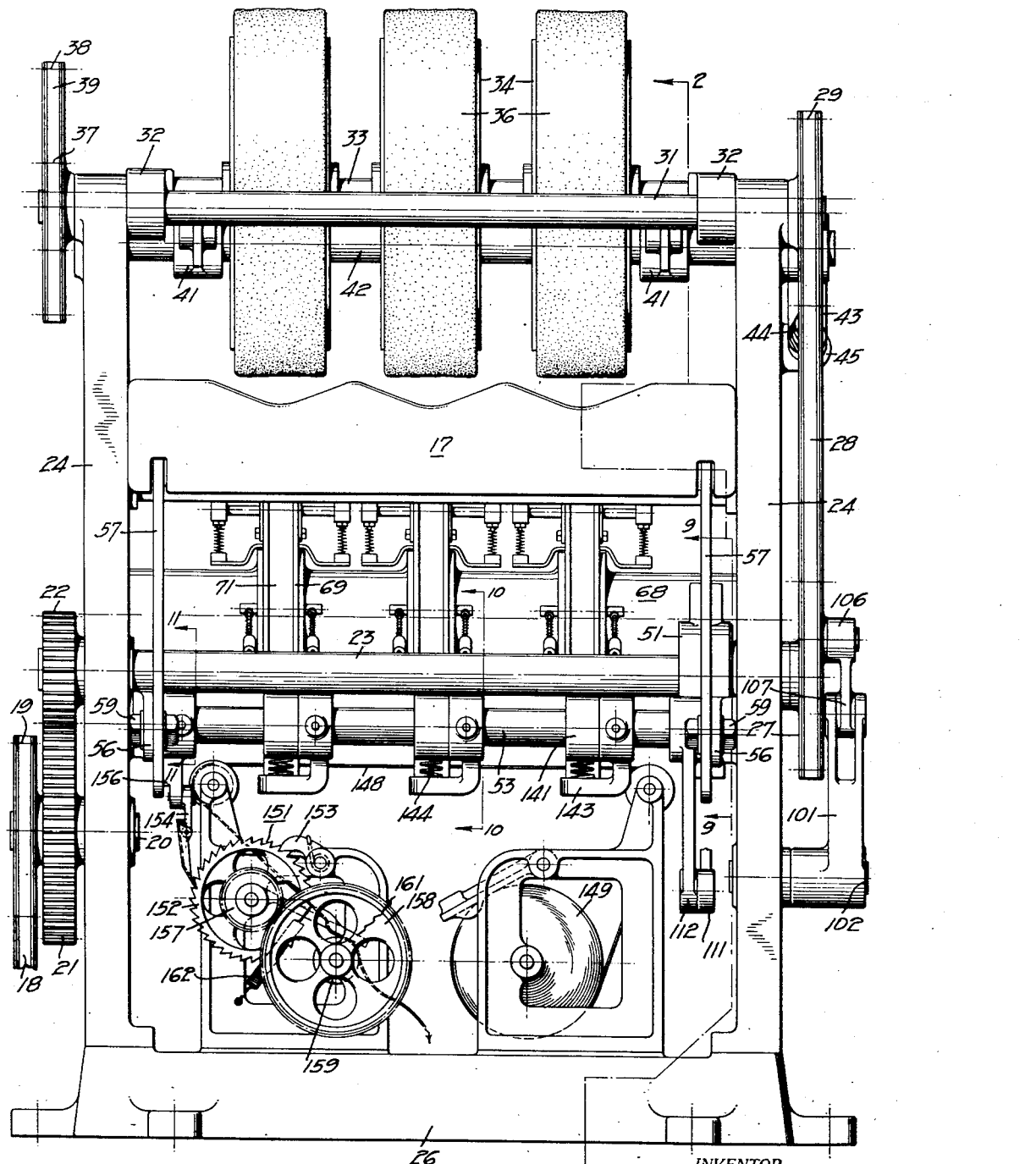
INVENTOR
Frank Ahlburg
BY
White, Prost, Flehr Lothrop
ATTORNEYS Dec. 6, 1932.    F. AHLBURG    1,889,967
FRUIT MARKER
Filed May 28, 1930    9 Sheets-Sheet 2
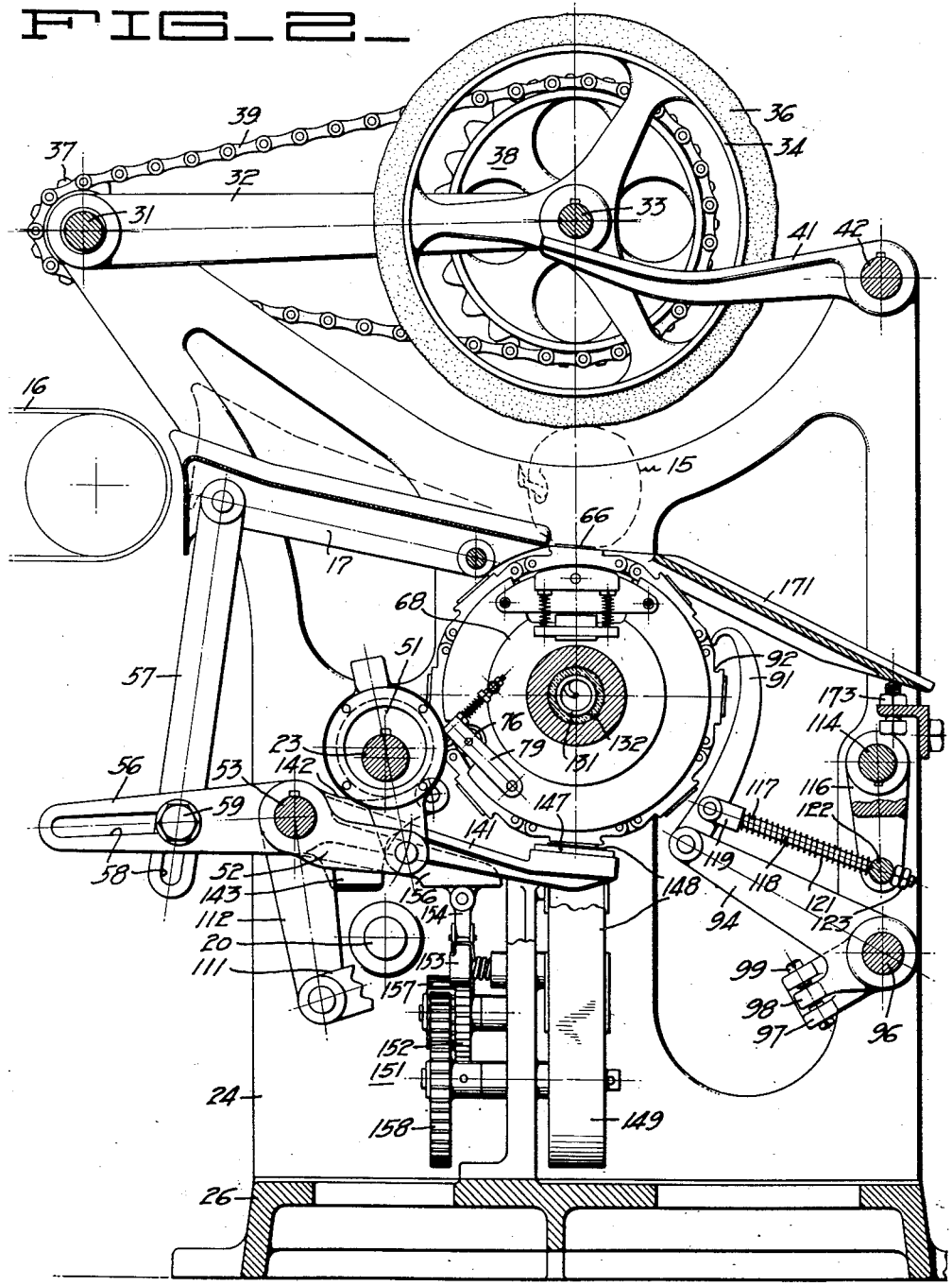
FIG_2_
INVENTOR
Frank Ahlburg
BY
White, Prost, Hehr & Lothrop
ATTORNEYS

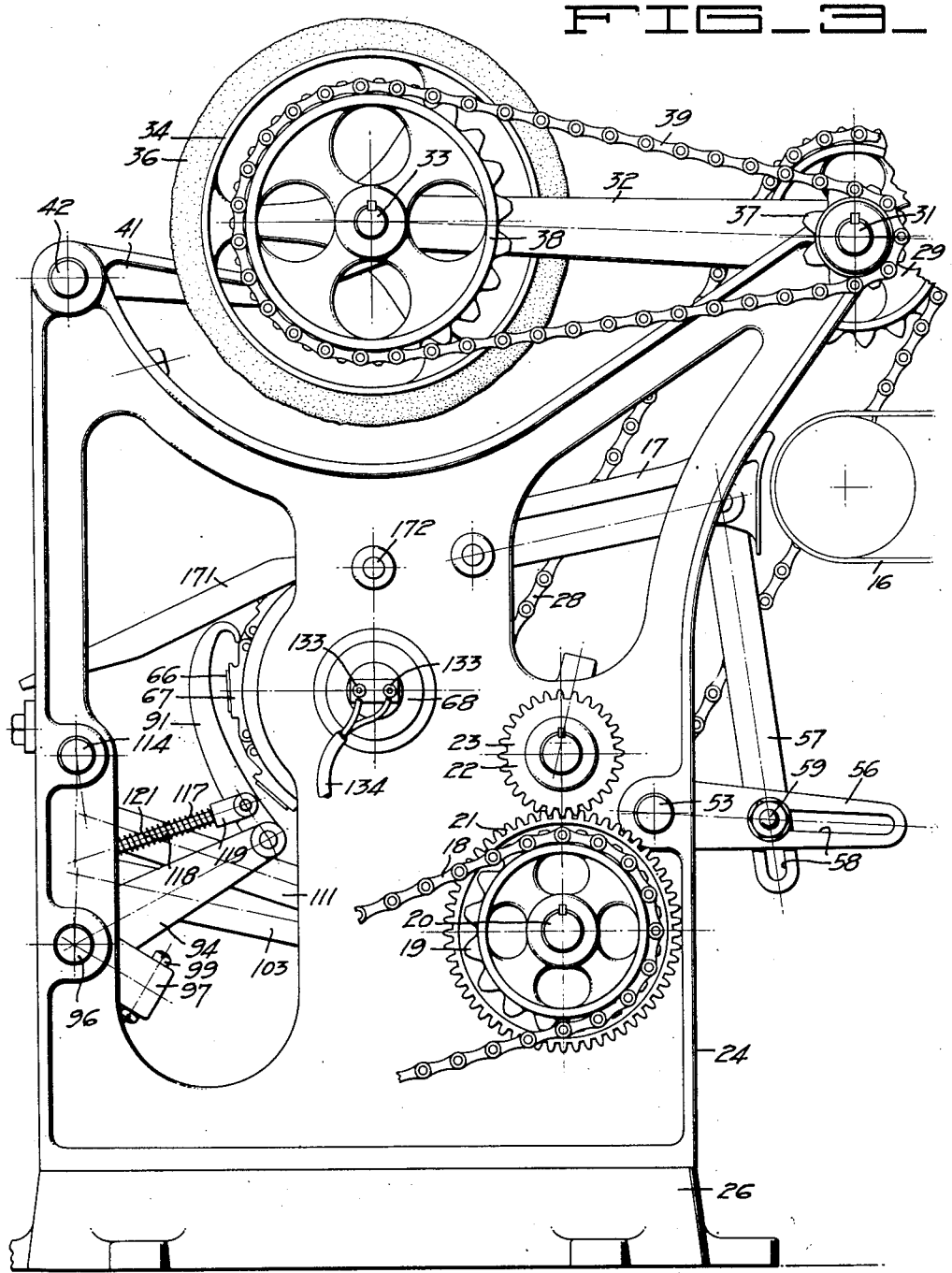

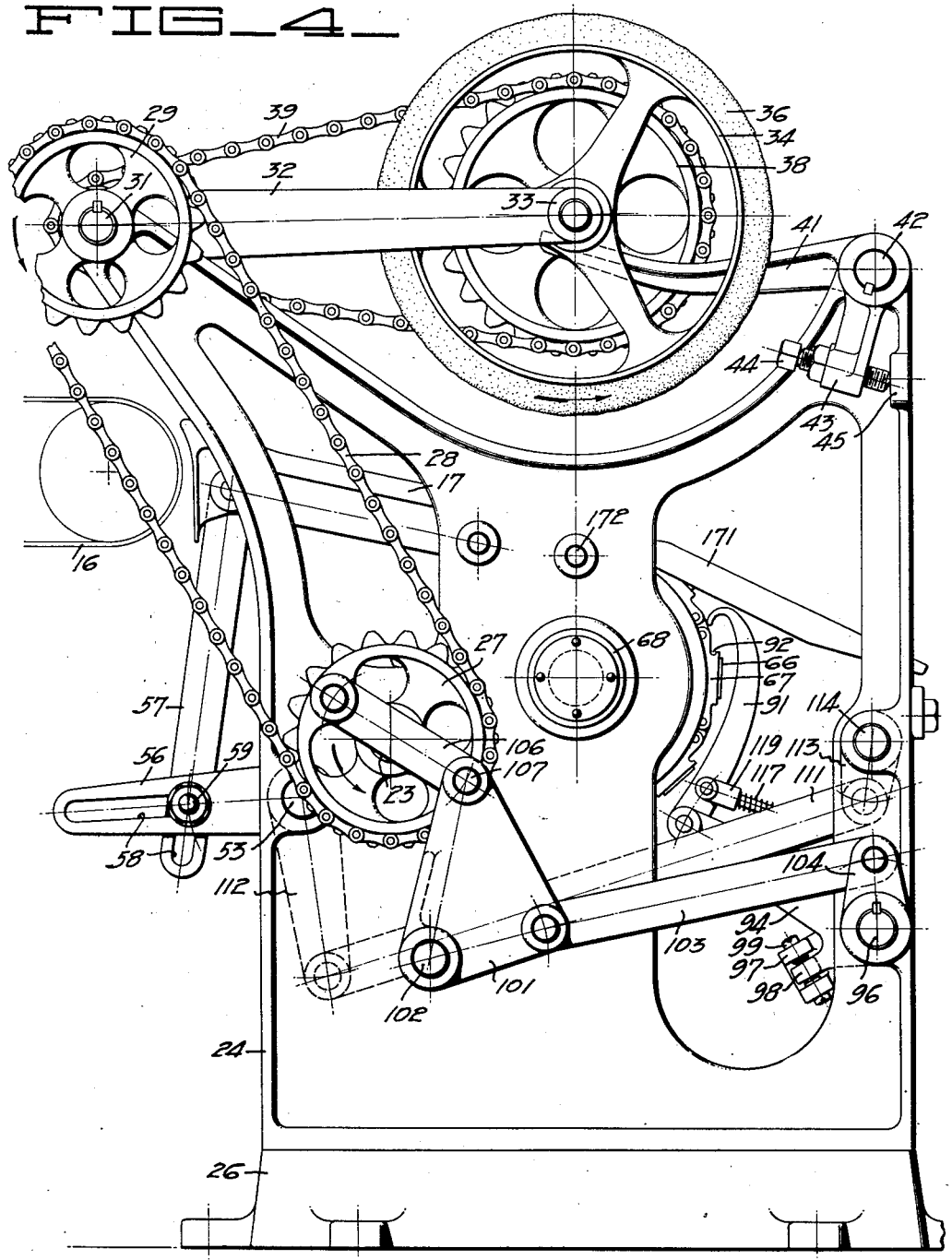

Dec. 6, 1932.  F. AHLBURG  1,889,967
FRUIT MARKER
Filed May 28, 1930  9 Sheets-Sheet 5
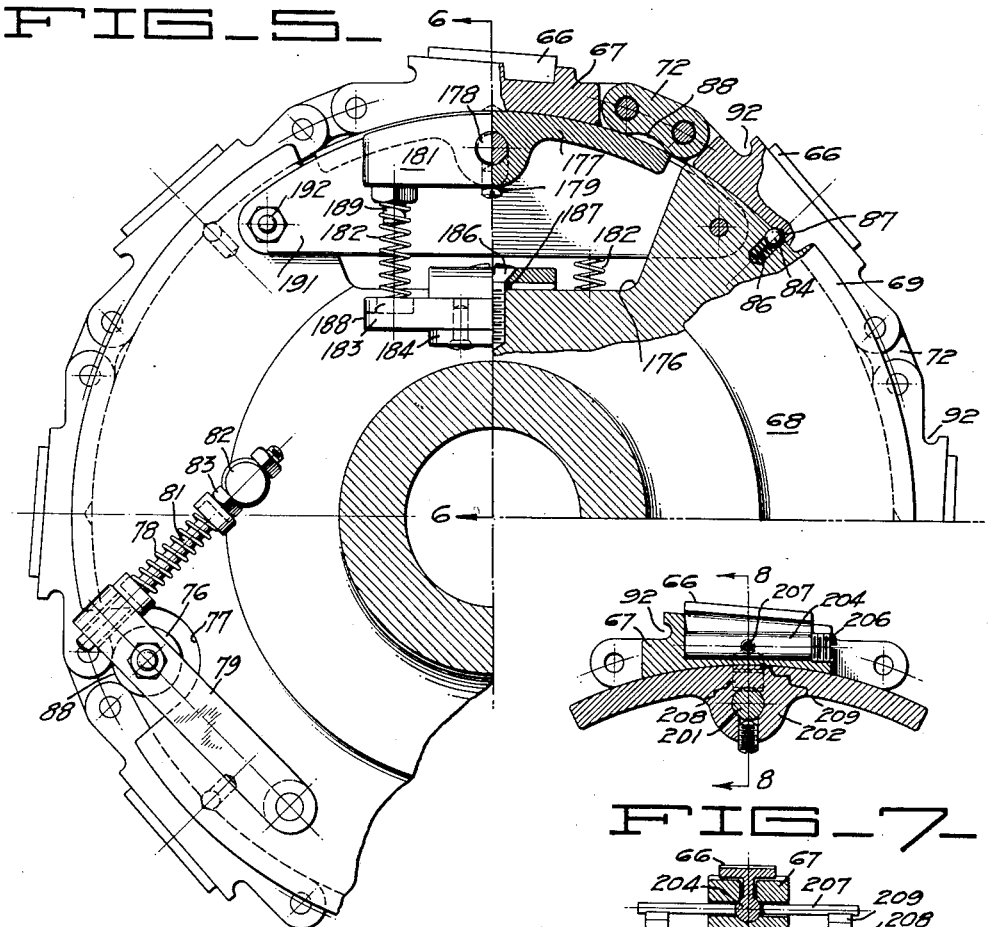
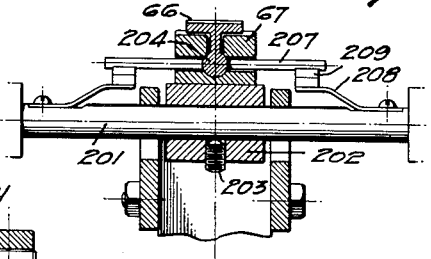
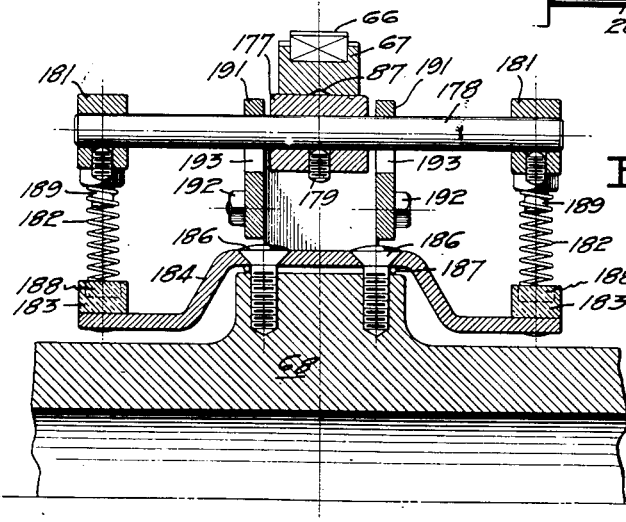
INVENTOR
Frank Ahlburg
BY White, Prost, Fehr & Lothrop
ATTORNEYS Dec. 6, 1932.     F. AHLBURG     1,889,967
FRUIT MARKER
Filed May 28, 1930     9 Sheets-Sheet 6
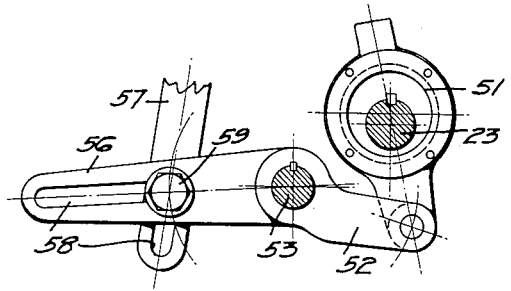
FIG_9_
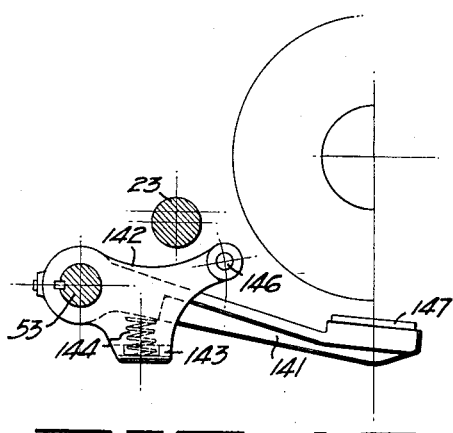
FIG_10_
FIG_11_
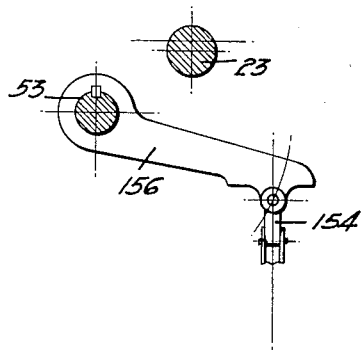
FIG_16_
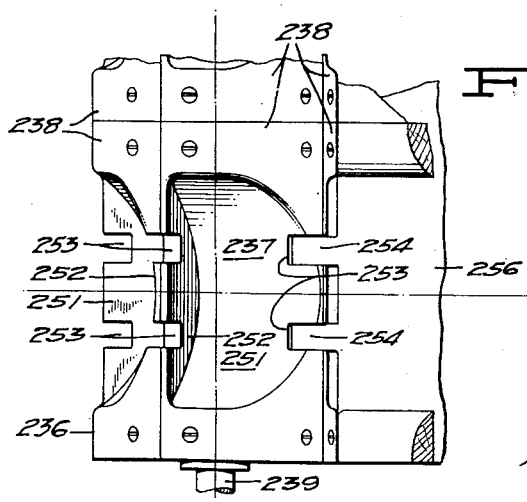
INVENTOR
Frank Ahlburg
BY
ATTORNEYS

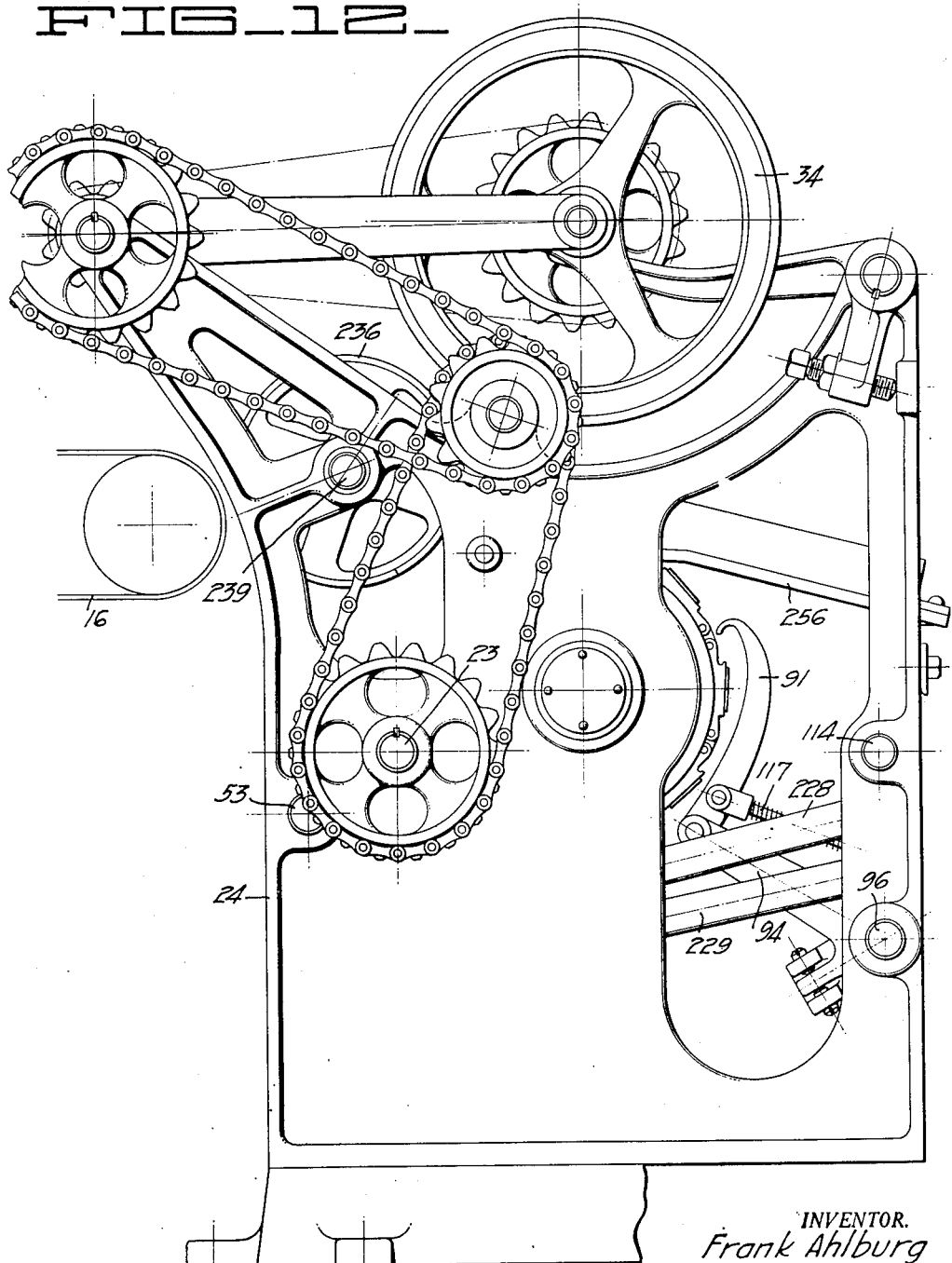

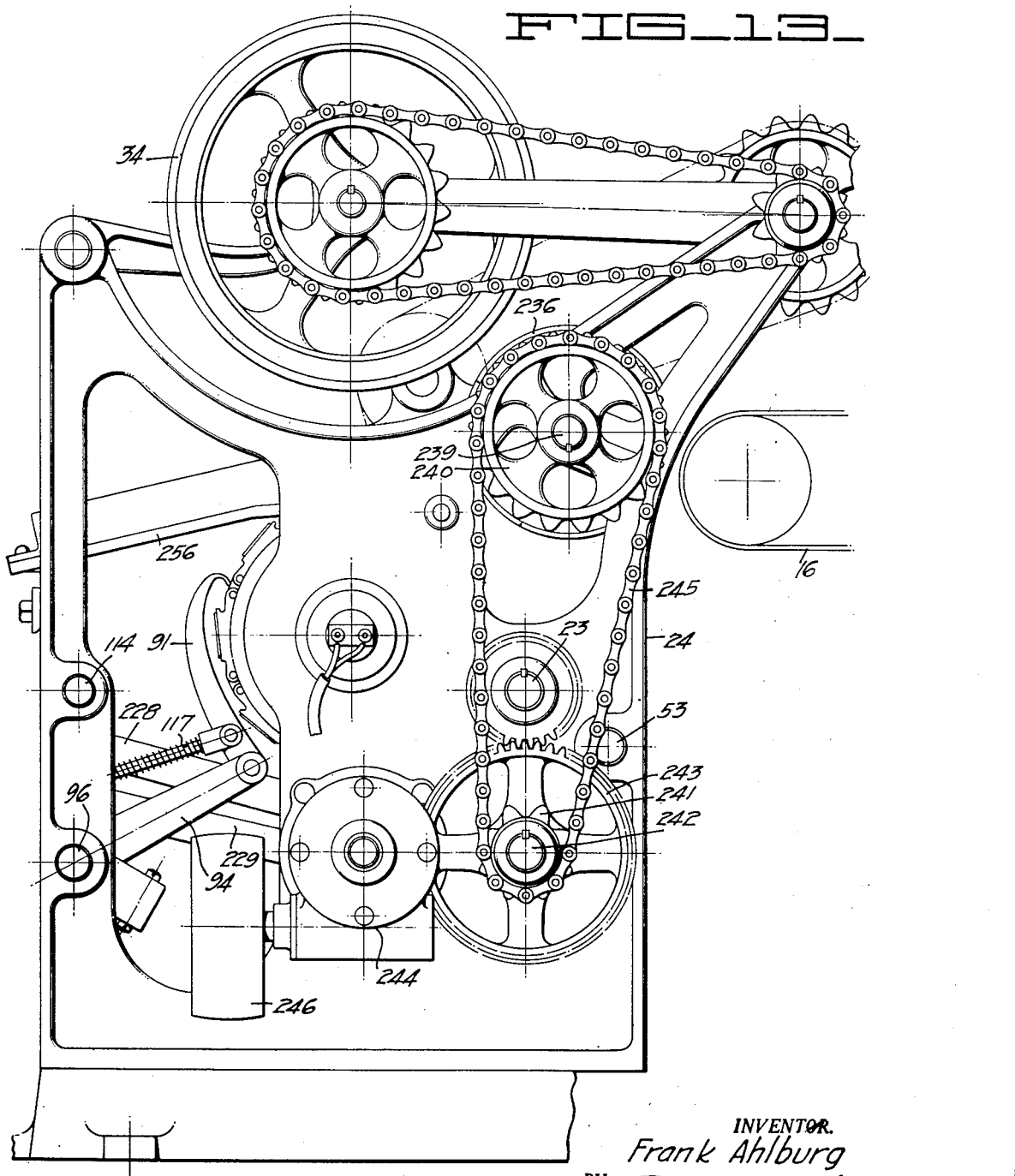

Dec. 6, 1932.  F. AHLBURG  1,889,967
FRUIT MARKER
Filed May 28, 1930  9 Sheets-Sheet 9
FIG_14_
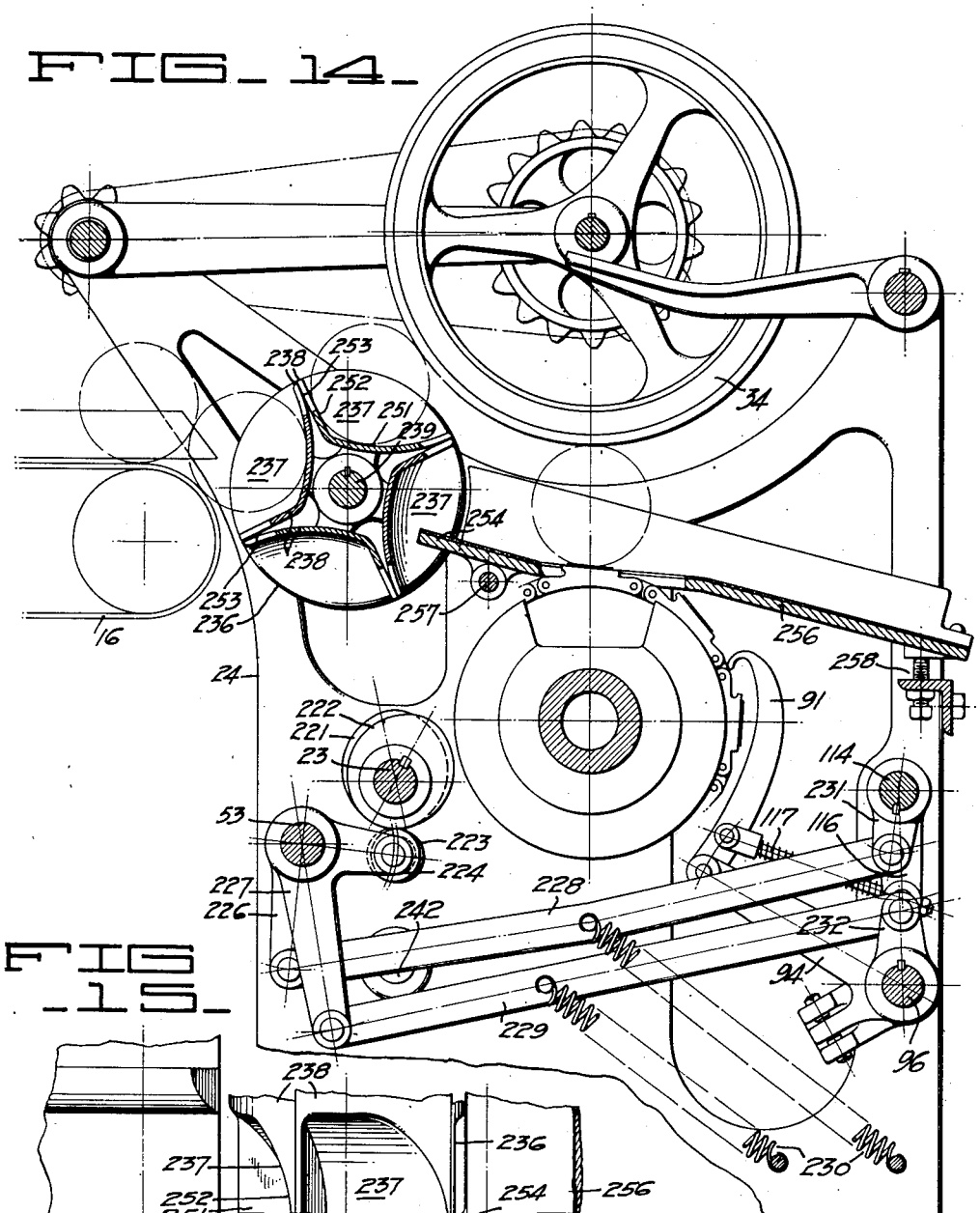
FIG_15_
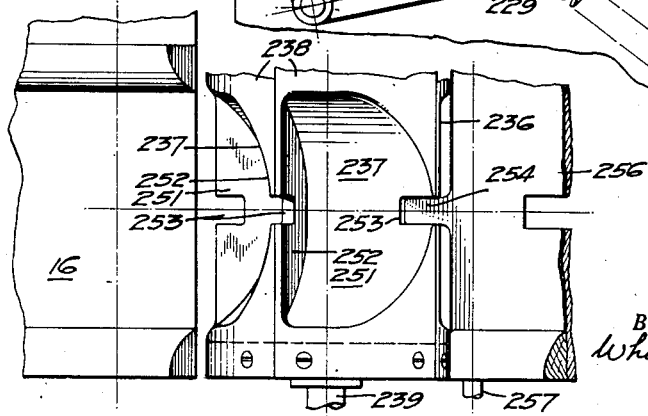
INVENTOR.
Frank Ahlburg
BY
White, Prost, Flehr & Lothrop
ATTORNEYS.

Patented Dec. 6, 1932

1,889,967

UNITED STATES PATENT OFFICE

FRANK AHLBURG, OF LOS ANGELES, CALIFORNIA, ASSIGNOR TO ELECTRIC FRUIT MARKING CO., OF LOS ANGELES, CALIFORNIA, A CORPORATION OF CALIFORNIA

FRUIT MARKER

Application filed May 28, 1930. Serial No. 456,430.

The present invention is concerned with the marking of the surface of articles such as fruit and particularly with fruits of the nature of apples which have a relatively hard unyielding surface and are subject to damage by bruising.

Previous marking machines have not been well adapted to the handling and marking of such articles as are typified by apples and it is an object of the present invention to devise a machine suitable for the successful marking of such articles.

A further object of the invention is to provide an improved die construction so that the surface of the fruit receives a full imprint of the die without injury.

A further object of the invention is to device an improved construction for a machine useful for the marking of articles. Previous machines have included heavy parts intermittently rotated whose operation created a great deal of noise and considerable wear upon the moving parts.

A further object of the invention is to devise a construction which delivers articles for marking so that a full imprint of the die on the article is secured.

The invention possesses other advantageous features and objects, some of which, with the foregoing, will be set forth at length in the following description where I shall outline in full that form of fruit marker of my invention which I have selected for illustration in the drawings accompanying and forming part of the present specification. In said drawings I have shown one form of fruit marker embodying my invention, but it is to be understood that I do not limit myself to such form since the invention, as set forth in the claims, may be embodied in a plurality of forms.

Figure 1 is an end elevational view looking toward the discharge side of the machine.

Figure 2 is a section through the elevation shown in Figure 1 on the line 2—2, the view illustrating the chain of dies for marking the fruit and the inking mechanism.

Figure 3 is an end elevation of a side of the machine, the view being taken from the left of the elevation shown in Figure 1.

Figure 4 is a side elevation looking at the right of the machine shown in Figure 1.

Figure 5 is a side elevation, partly in section, illustrating the construction of the chain of dies and the body about which they are moved.

Figure 6 is a cross section on the line 6—6 of Figure 5, illustrating the manner of resiliently mounting the dies for universal movement.

Figure 7 is a section through another form of mounting for the dies.

Figure 8 is a section along the line 8—8 of Figure 1.

Figure 9 is a section along the line 9—9 of Figure 1, the view illustrating the relationship of certain of the parts used to secure a reciprocal movement.

Figure 10 illustrates the construction of the pad arm for inking the dyes, the section being taken along the line 10—10 of Figure 1.

Figure 11 is a view illustrating the construction of the ribbon feeding actuating mechanism, the section being taken along the line 11—11 of Figure 1.

Figures 12 and 13 are respectively side elevational views from opposite sides of a machine embodying other advantageous features.

Figure 14 is a side elevational view with a side of the machine removed to illustrate another dye moving mechanism and another form of feeder mechanism.

Figures 15 and 16 illustrate in plan the construction of different article feeding mechanisms.

In the drawings I have shown a machine in triplicate, that is, three separate series of dies and certain additional parts are provided for handling three lines of fruit. Of course, if desired, more or less units may be employed.

The fruit is delivered to each series of dies from a conveyor mechanism 16 to a trough 17 which carries the fruit to a point where it contacts with the dies indicated at 15. The trough is preferably reciprocated between an upper position, indicated by the dotted lines in Figure 2 wherein it prevents fruit from passing off the conveyor, to a lower position, indicated by full lines, in which it receives fruit from the conveyor. The trough is formed to have an obtuse angle so that the articles, when delivered to the die, present a full continuous surface for contact therewith. Movement of the trough to the upper position speeds up the passage of the fruit and ensures that it moves rapidly across the die while securing the feeding of the article or fruit to be marked in proper relationship to other operations of the machine.

Power for the reciprocation of the trough and for the movement of other parts of the machine is transmitted by a chain 18 from the power source used to drive the conveyor so that the conveyor is operated in time with the machine. The chain extends over a sprocket 19 carried on the stub shaft 20. The sprocket 19 is secured to a gear 21 which is in mesh with a second gear 22 secured to a rotatable shaft 23. The stub shaft 20 and the rotatable shaft 23 are mounted for rotation in bearings provided in side members 24 forming a frame for the machine in conjunction with a base 26. The shaft 23 extends through the side members and has positioned upon it a sprocket 27 as is shown in Figure 4. A chain 28 is passed about the sprocket 27 and about another sprocket 29 secured at the upper portion of the frame upon a shaft 31. Arms 32 are freely positioned on the shaft 31 and extend forward to carry a driven shaft 33 to which are secured wheels 34 having their peripheries covered with a suitable resilient material 36 capable of engaging the fruit without damaging it. A suitable material is sponge rubber. The wheels 34 are each positioned adjacent the troughs 17 so that an article passing over the trough and coming in contact with the die is engaged with the resilient material on the wheel and is pressed onto and then moved rapidly from off of the die. Rotation of the wheels 34 is secured by means of sprockets 37 and 38 respectively positioned upon the shaft 31 and the driven shaft 33 and having a chain 39 extending about them.

The several wheels are supported in the desired relationship of the troughs and dies by means of arms 41 secured to a movable shaft 42 positioned in the side members 24, the position of the shaft relative to the frame being controlled by means of an extending arm 43 secured to the shaft. The arms 41 are adjustable with respect to the machine by means of set screw 44 engaging an ear 45 provided upon one of the side members and effective to rotate the shaft 42. The arms 41 are adjusted to support the shaft 33 so that the wheels are spaced from the dies to engage an article only partially.

Reciprocation of the troughs 17 is secured by the provision of an eccentric 51 on the driving shaft 23 as is shown in Figures 2 and 9. The eccentric is effective to oscillate an arm 52 secured to a shaft 53 which is journalled in the side members 24. Fingers 56 are positioned on the shaft 53 for oscillation therewith and are secured to links 57 which extend to a trough. Adjustment of movement of the trough is secured by means of slots 58 provided in the fingers 56 and in the links 57, bolts 59 being extended through the slots to secure the fingers and links together in a desired position.

Means are provided for marking fruit delivered to the troughs 17 so that the full mark is placed upon the surface of the article without damage to the article. This means is preferably capable of accommodating itself in some degree to the surface which is to be marked so that a full mark is placed upon the surface and, also, so that instead of deforming the surface of the article to the die the die is moved to accommodate for the surface of the article. To accomplish this I prefer that a relatively light structure capable of intermittent revolutions be provided which is not apt to create a great deal of noise in operation and which does not entail the stopping and starting of a relatively heavy body, thus obviating excessive wear. In accordance with my invention I provide a plurality of dies 66 suitably positioned and retained in supporting bodies 67. Each of the dies 66 usually carries the mark which is to be placed upon the article so that a single contact between the die and the article is sufficient to mark the article.

Means are provided for bringing each of the dies 66 into position to mark an article. As is shown in Figure 2 an article is positioned for marking between the wheel 34 and a die, the contact between the die and the article being practically instantaneous. A body or shaft 68, supported between the members 24, has rims 69 formed thereon which define channels 71 about which the dies are moved. The dies carried in their supporting bodies 67 are secured together by links 72 to form a chain of dies which extends about the body 68.

Means are provided for retaining the chain of dies tensioned about the shaft 68. A roller 76 is positioned in a cutaway portion 77 of the shaft so that it bears against the underside of the bodies 67 and the links 72. The roller is urged against the chain by springs 78 which bias hinged arms 79 to hold the roller away from the periphery of the body 68 so that a tension is maintained on the chain. Adjustment of the tension is secured by moving the rods 81 upon which the springs are positioned with respect to stops 82 by means of nuts 83.

To ensure that the dies, when moved about the body 68, come to rest at the same position each time, I provide ball checks 84 biased by means of the springs 86 to engage notches 87 cut in each of the bodies 67. The roller 76 also cooperates with an arcuately shaped under face 88 on each of the chain links 72 to stop the dies in a certain relationship to the body 68 each time that the chain of dies is moved.

Means are provided for rotating the chain of dies about the body 68 so that a different die is presented to each of the articles successively advanced over the trough 17 for marking. This means is preferably coordinated so that with each movement of the trough 17 another die is advanced to marking position about the body 68. A retractible finger 91, mounted for reciprocating movement, is provided to engage a notch 92 cut in each of the bodies 67 and to drag the chain about the body so that another die is advanced to marking position. Movement of the finger 91 is effected by suitable means so that the finger is drawn into engagement with the notch 92 to bring the chain of dies around to a position where another die is in marking position and so that the finger 91 is thereupon lifted out of contact with the slot 92 and is carried out free of the chain to an upper position for engagement with the slot in another die. Vertical reciprocating movement of the finger is effected by a reciprocable bell crank 94 provided upon a shaft 96 for movement therewith. Movement of the bell crank is secured by a lever 97 keyed on the shaft 96 and engaging the bell crank at 98. The engagement between the bell crank and the lever 97 is adjustable by means of the screws 99 so that the vertical movement of the finger 91 may be adjusted.

Oscillation of the shaft 96 in timed relationship to the operations of the rest of the machine is secured by means of a plate 101 mounted for rotation about a bearing 102 as is shown in Figures 1 and 4. The plate is joined by a link 103 to a finger 104 keyed upon the shaft 96. The plate 101 is moved by a lever 106 secured to the sprocket 27 and to the plate 101 at 107.

The timed horizontal movement of the finger 91 toward and away from the chain of dies, so that the finger engages the slot 92 and moves the chain about the body 68 to be then disengaged and brought back to engage another slot, is secured in timed relationship to downward movement of the finger by a link 111 extending from a finger 112 keyed to the shaft 53. The shaft 53, as previously mentioned, is moved in timed relationship to other machine operations by means of the eccentric 51 which is positioned on the driving shaft 23. The link 111 extends to a finger 113 keyed to the shaft 114 which it reciprocates upon reciprocal movement of the shaft 53. The oscillation of the shaft 114 is effective, as is shown in Figure 2, to move a lever 116 which is joined to the finger 91 by a resilient connection 117, to cause the finger 91 to be brought into engagement with a die body and to be held there until rotation of the chain of dies has been effected, whereupon the finger is brought back to engage another die body.

The resilient connection between the lever 116 and the finger 91 is formed by a rod 118 joined to the finger 91 by coupling 119 and biased away from the finger 116 by a spring 121 positioned about the rod and abutting against a pin 122 on the lever. The rod extends through the pin and is secured by nuts 123.

It is to be noted that the vertical and horizontal movement of the finger 91 is effected by means operated from the drive shaft 23 so that the vertical and horizontal movements are properly coordinated to secure the desired movement in timed relationship to the other operations of the machine.

The machine may be operated to mark articles with the dies 66 heated to ensure that natural wax or other coating on the article is temporarily removed so that the skin of the article is marked. The machine may also be operated without the application of heat and, also, with or without the application of ink to the surface of the article. When it is desired that the article be marked with an application of heat, the body 68 is provided with a hollow center in which a heating element 131 is positioned, the element being held in spaced relationship from the body 68 by means of a refractory core 132. Connectors 133 are provided to the heating element to which a suitable source of energizing current is carried through conductors 134.

It is to be particularly noted that the chain of dies is held in close relationship to the solid body 68 so that good thermal contact is ensured and the heat is available to remove or cause a flow of the natural wax or coating upon the article to be marked so that the surface or skin of the article is altered by the application of heat.

Means are provided for inking the dies when it is desired that the surface to be marked be inked. A pad arm 141 is used to press an inked ribbon 148 against the die to be inked. The arm is freely mounted upon the oscillating shaft 53 while a bell crank 142 is keyed to the shaft for oscillation therewith. The bell crank is provided with an extending ear 143. A spring 144 is provided between the pad arm and the extending ear 143 so that the pad arm is resiliently mounted. The bell crank is provided with a pin 146 extends to engage directly the pad arm upon extreme movement thereof so that the pad arm is restricted in its upward movement and is forced down positively away from the die. A pad of suitable and resilient material as cork or rubber 147 is provided upon a portion of the pad arm so that the inked ribbon 148 is pressed resiliently against the die.

The ribbon is drawn from a supply roll 149 across the die or dies to be inked by a suitable feeding mechanism indicated generally at 151. This feeding mechanism comprises a ratchet 152 limited to rotation in only one direction by pawl 153. A retractible finger 154 which is mounted on an arm 156 for oscillation with the shaft 53 serves to rotate the ratchet. The ratchet 152 drives a gear 157 which in turn engages a gear 158, the gears 157 and 158 being of such a size that a ribbon engaging roller 159 turns at an extremely slow rate. The ribbon is held in engagement with the roller 159 by a slotted arm 161 which presses the ribbon against the roller, the gravitational pressure of the arm being enhanced by a spring 162. The ribbon is fed through the machine at a very slow rate and is usually of such a length that one ribbon suffices for a day's run.

In operation, articles to be marked such as apples are supplied to the conveyor 16. The marking machine is driven in timed relationship to the conveying mechanism so that, as the apples are advanced by the conveyor, the trough 17 is lowered to receive one and is then raised to advance the apple rapidly across the face of the die. I have found it desirable to have the face of the die formed to continue the angle of the conveyor so that the apple or other articles does not tend to skip across the die. Further, I have found that when the article to be marked rolls on the die it comes into contact with all parts of the die and a full mark is secured on the article. In one form of the invention I provided the dies 66 angularly with respect to the horizontal as is shown particularly in Figures 2 and 5, so that they continued substantially the line of the trough 17 when in marking position. By providing the dies to continue the trough and by causing the trough to be raised so that the apple is moved rapidly across the die by gravity, the number of apples receiving a full mark has been increased by about 15%. Also, the number of apples on which only a partial mark was placed because of presentation of the flower end or the stem end to the die has been decreased. I attribute this to the rolling of the apple gravitationally toward the die since an apple usually rolls best on its side as compared to rolling end over end.

The fruit, after being marked, passes on to discharge trough 171 to be conveyed away. The angle of the discharge is adjustable so that the fruit is rapidly removed and conducted to another conveyor mechanism without bruising. This adjustment is secured by pivotally mounting the discharge as at 172 and adjustably supporting the end of the discharge by means of the adjustable set screw 173.

I have also found it desirable to provide other means for ensuring that a full surface contact is secured between the article to be marked and the die. Means are therefore included for mounting each die for universal movement so that each die readily accommodates itself and accustoms itself substantially to the surface of the article passing over it. A construction accomplishing this is shown in Figures 2, 5 and 6 wherein the solid body 68 is cut away as at 176 adjacent the position in which the die is placed for marking. A body 177 is provided, the face of which is arcuately formed to continue the periphery of the solid body 68 and to support each die body 67 in marking position. The arcuately formed body 177 is mounted upon a rod 178 to which it is secured by means of a set screw 179. Universal and resilient mounting of the die is accomplished by supporting the rod in side members 181. These side members are in turn mounted upon springs 182 provided between the side members and supported upon bars carried by a bracket 184. The bracket is preferably held in spaced relationship to the body 68 by means of screws 186, a wire 187 being extended about the screws between the bracket and the body so that air circulation can occur between them. The bars 183 are preferably formed with recesses 188 to receive the springs while the members 181 are formed to receive adjustable lugs 189 which retain the springs in position. Movement of the rod 178 is preferably limited by providing side plates 191, the side plates being secured to the body 68 by bolts 192. Apertures 193, defining the desired limit of travel of the rod 178 and thereby of the dies 66, are provided in the side plates.

It is to be noted that the ball checks 84 engaging the notches 87 in the die bodies 67 are provided on opposite sides of the cutaway portion 176 so that that portion of the chain over the cutaway portion is free for a certain amount of movement by virtue of the clearances and spring in the several joints in the chain. This degree of play is usually sufficient to permit of the desired universal movement of the die to accommodate itself to the surface to be marked.

The transmission of heat to the dies is accomplished by virtue of thermal contact existing between the dies as they are advanced about the body 68 so that when they come into marking position they contain sufficient heat for the purpose desired. Usually a temperature between 155° and 165° F. is sufficient for the marking of fruit.

In Figures 7 and 8 I have illustrated another form of mounting the die so that full surface contact with the article to be marked may be secured. In this instance a rod 201 is extended through a supporting body 202, the rod being suitably mounted. If desired, the construction for supporting the rod shown in Figure 6 can be employed. The die 66 positioned in the body 67 is formed with a circular portion 204 and is retained in the body 67 by set screw 206. A rod 207 extends transversely through the circular portion 204 and is spaced from the body 67 through which it passes so that a rocking movement of the die is possible. This rocking movement is preferably resilient and to accomplish this I provide flat springs 208 on the rod 201, the springs carrying members 209 for engagement with the rod 207 as the die comes into marking position. This construction is capable of finer adjustment than that shown in Figures 5 and 6.

In operation, the trough 17 delivers one article at a time to be marked. As the trough is raised the article rolls down the trough and approaches the die where it comes into contact with the resilient material on the periphery of the wheel 34. The wheel is usually positioned close enough to the die to engage the article and cause it to lift the wheel as it passes over the die. This causes the die to move to accommodate itself to the surface of the article so that a full surface contact is secured. Rotation of the wheel causes the article to roll on the die and pass off into the discharge.

In Figures 12, 13, 14, 15 and 16 I have shown modified forms of the fruit marker of my invention which embody certain desirable features making generally for quicker and more efficient marking of the articles. In this connection, I have found it desirable to impart a particularly smooth and continuous manner of operation to the finger 91. In the form of the invention particularly shown in Figure 14 I have illustrated a mechanism for accomplishing this in which cams 221 and 222 are mounted for rotation with the rotatable shaft 23. The cams' peripheries are engaged by rollers 223 and 224 respectively carried by bell cranks 226 and 227 mounted upon the shaft 53. Rotation of the shaft 23 causes the bell cranks 226 and 227 to follow movement of the cams 222 and 221 in such a manner that the bell cranks transmit through levers 228 and 229, tensioned by springs 230, a reciprocating motion to both the shafts 96 and 114 to which the levers are joined by means of arms 231 and 232. The finger 91 is positioned with respect to the shaft 96 by means of the bell crank 94 and by the resilient connection 117 which extends between the finger and arm 116.

The above described mechanism for securing the reciprocal movement of the finger 91 is provided more conveniently and advantageously and is also effective to secure a smoother and more desirable motion of the finger 91 so that it effects the movement of the die chain in a simpler, quieter and more efficient manner.

I have also found that the conveyor means or feeding mechanisms particularly shown in Figures 14, 15 and 16 is very useful when handling articles such as apples since the articles are delivered to the die in such a manner that the stem end or flower end is not presented to the die. This feeding mechanism comprises a roller, generally designated as 236, which is provided with a plurality of cups 237 formed about its periphery. The roller is positioned to take fruit from the conveyor 16 by means of a series of cups corresponding to the number of runways to be marked. The number of cups provided in a circuit about the roller are such that the speed with which the articles are transferred from the mechanism delivering them to the roller is coordinated with the action of the machine. I have successfully employed a roller in which four cups were provided to care for the fruit being delivered from a runway. The roller structure is formed of separate cup units 238 which are secured together, as shown in Figures 15 and 16, about suitable supports or the roller can be cast integrally as one body.

In the form shown in the drawings, the roller is supported upon a shaft 239 which carries a sprocket 240 connected to a sprocket 241 by means of a chain 245. The shaft 239 is supported upon the side members 24 in suitably provided bearings. The sprockets 241 and 240 are proportioned so that the speed of the delivery of the fruit is that which is desired. The sprocket 241 is carried upon a stub shaft 242 as is a gear 243 which is secured to the sprocket. The gear 243 is enmeshed with a gear speed reducer generally indicated at 244 and which carries a pulley 246 for receiving a belt from a suitable source of power.

The cups 237 are formed by a circular surface 251 and a planar surface 252 meeting in such a fashion that the planar surface forces the fruit out during rotation of the roller so that it rolls gravitationally and finally comes into contact with the periphery of the wheel 34 which presses it onto the positioned die. In this connection, I have found it desirable in handling articles as apples, to to have the periphery of the wheel of less extent at the middle of its face than at the edges so that the wheel keeps the articles centered.

I have also found it desirable to provide slots 253 in each of the cups into which corresponding fingers 254 of each of the runways 256 extend so that the fruit is removed from the cup if it should not be thrown out. The number of slots and fingers can be varied and, in some instances, I have found that a single slot and finger suffice and in others, have found it advantageous to use two, particularly when handling a fruit as lemons. The use of two slots provided toward the outer portions of the cup ensures the removal of the fruit from the cup and at the same time, obviates to a considerable extent the chances and tendency for the fruit to become engaged with the fingers and subsequently crushed upon further rotation of the roller.

The fruit, upon operation of the machine, is discharged from the roller onto the runway 256 suitably positioned as at 257 and 258 so that it is substantially rigid. The fruit passes across the face of the die then in position and becomes marked. It is then forced by means of the wheel down the runway to pass onto other packing or handling mechanisms. The rotation of the roller feeds the articles in proper timed relationship, holding back the articles and feeding them in order so that each passes over a die when it is properly positioned.

I claim:

1. In a marking machine, a heated element, a plurality of separate dies, and means for securing said separate dies together to form a rotatable chain about and substantially in thermal contact with said heated element.

2. In a machine for marking articles, a yieldingly mounted rigid die, means for rolling an article to be marked onto and over said die, and means for yieldingly pressing the article onto the die.

3. In a machine for marking articles, a rigid die resiliently mounted for universal movement, means for rolling an article to be marked onto and over said die, and means for yieldingly pressing the article onto the die so that the die accommodates itself to the article.

4. In an apparatus of the class described, a heated body, a chain of identical dies positioned about the body in heat-transmitting relationship, means for intermittently advancing the chain of dies about the heated body so that each die successively occupies a marking position, means for supplying an article to be marked by each die as it is in marking position, and means for supporting each die in marking position to secure substantially full surface contact with the article to be marked.

5. In an apparatus of the class described, a body, a chain of identical dies positioned about the body, means for intermittently advancing the chain of dies about the body so that each die successively occupies a marking position, means for supplying an article to be marked by each die as it is in marking position, and means for supporting each die in marking position to secure substantially full surface contact with the article to be marked.

6. In an apparatus of the class described, a plurality of links joined together to form a chain, a plurality of dies carried loosely by links of the chain, means for extending the chain to occupy a predetermined path, means for intermittently advancing the chain over the path so that each die in turn occupies a marking position for contact with an article to be marked, and means for resiliently supporting each die in marking position to secure full surface contact with the article.

7. In an apparatus of the class described, a plurality of links joined together to form a chain, a plurality of dies carried loosely by links of the chain, means for extending the chain to occupy a predetermined path, means for intermittently advancing the chain over the path so that each die in turn occupies a marking position for contact with an article to be marked, means for resiliently supporting each die in marking position to secure full surface contact with the article, the means including a member adapted to engage the link carrying the die in marking position, and means for mounting the member for universal movement.

8. In an apparatus of the class described, a plurality of dies joined together to form a chain, a body for supporting the chain, means for engaging a portion of the chain, means for resiliently mounting the engaging means, and means for intermittently advancing the chain about the body so that each die successively occupies a position in which it is supported by the resiliently mounted engaging means whereby full surface contact of the die with an article to be marked is secured.

9. In an apparatus of the class described, a plurality of dies joined together to form a chain, a body for supporting the chain, the body being adapted to be heated to supply heat to the dies, means for engaging a portion of the chain, means for resiliently mounting the engaging means, and means for intermittently advancing the chain about the body so that each die successively occupies a position in which it is supported by the resiliently mounted engaging means whereby full surface contact of the die with an article to be marked is secured.

10. In an apparatus of the class described, a plurality of dies joined together to form a chain, a body for supporting the chain, means for engaging a portion of the chain, means for resiliently mounting the engaging means, means for intermittently advancing the chain about the body so that each die successively occupies a position in which it is supported by the resiliently mounted engaging means whereby full surface contact of the die with an article to be marked is secured, and means for engaging a die during advancing movement of the chain to bring the die to rest in a predetermined position.

11. In an apparatus of the class described, a plurality of dies joined together to form a chain, a body for supporting the chain, means for engaging a portion of the chain, means for resiliently mounting the engaging means, means for intermittently advancing the chain about the body so that each die successively occupies a position in which it is supported by the resiliently mounted engaging means whereby full surface contact of the die with an article to be marked is secured, means for tensioning the chain about the body and the engaging means, and means for engaging a die during advancing movement of the chain to bring the die to rest in a predetermined position.

12. In an apparatus of the class described, a plurality of links joined together to form a chain, a plurality of dies carried by links of the chain, a stationary body about which the chain is extended to occupy a predetermined path, means for advancing the chain over the path so that each die in turn occupies a marking position for contact with an article to be marked, and means for resiliently supporting each die in marking position to secure full surface contact with the article.

13. In an apparatus of the class described, a plurality of links joined together to form a chain, a plurality of dies carried by links of the chain, a stationary body about which the chain is extended to occupy a predetermined path, means for intermittently advancing the chain over the path so that each die in turn occupies a marking position for contact with an article to be marked, means for resiliently supporting each die in marking position to secure full surface contact with the article, the means including a member adapted to engage the link carrying the die in marking position, and means for mounting the member for universal movement with respect to the stationary body.

14. In an apparatus of the class described, a heated body, a chain of identical dies positioned about the body in heat transmitting relationship, means for intermittently advancing the chain of dies about the heated body so that each die successively occupies a marking position, means for supplying an article to be marked by each die as it is in marking position, means for supporting each die in marking position to secure substantially full surface contact with the article to be marked, and means for pressing each article to be marked onto a positioned die.

15. In an apparatus of the class described, a plurality of dies joined together to form a chain, a body for supporting the chain, means for engaging a portion of the chain, means for resiliently mounting the engaging means, means for advancing the chain about the body so that each die successively occupies a position in which it is supported by the resiliently mounted engaging means whereby full surface contact of the die with an article to be marked is secured, and means for pressing each article to be marked onto a positioned die.

16. In an apparatus of the class described, a heated body, a chain of identical dies positioned about the body in heat transmitting relationship, means for advancing the chain of dies about the heated body so that each die successively occupies a marking position, means for supplying an article to be marked by each die as it is in marking position, means for supporting each die in marking position to secure substantially full surface contact with the article to be marked, and means for inking each of said dies during advancement about the body.

17. In an apparatus of the class described, a plurality of dies joined together to form a chain, a body for supporting the chain, means for engaging a portion of the chain, means for resiliently mounting the engaging means, means for intermittently advancing the chain about the body so that each die successively occupies a position in which it is supported by the resiliently mounted engaging means whereby full surface contact of the die with an article to be marked is secured, and means for inking each of said dies during advancement about the body.

18. In a marking machine, a relatively stationary heated body, a plurality of rigid dies, means for uniting said dies into an articulated chain encompassing said body in thermal contact therewith, and means for intermittently advancing said chain around said body.

In testimony whereof, I have hereunto set my hand.

FRANK AHLBURG.